United States Patent
Asari (10) Patent No.: US 9,254,720 B2
(45) Date of Patent: Feb. 9, 2016

(54) PNEUMATIC TIRE FOR CONSTRUCTION VEHICLE

(75) Inventor: Jyunya Asari, Kodaira (JP)

(73) Assignee: BRIDGESTONE CORPORATION, Tokyo (JP)

( * ) Notice: Subject to any disclaimer, the term of this patent is extended or adjusted under 35 U.S.C. 154(b) by 1220 days.

(21) Appl. No.: 13/148,204

(22) PCT Filed: Jan. 26, 2010

(86) PCT No.: PCT/JP2010/000425
§ 371 (c)(1),
(2), (4) Date: Sep. 30, 2011

(87) PCT Pub. No.: WO2010/089969
PCT Pub. Date: Aug. 12, 2010

(65) Prior Publication Data
US 2012/0006455 A1   Jan. 12, 2012

(30) Foreign Application Priority Data

Feb. 6, 2009  (JP) ................................ 2009-026207

(51) Int. Cl.
*B60C 11/11* (2006.01)
*B60C 11/12* (2006.01)
*B60C 11/03* (2006.01)

(52) U.S. Cl.
CPC ............. *B60C 11/12* (2013.01); *B60C 11/0311* (2013.04); *B60C 2011/0346* (2013.04); *B60C 2011/0348* (2013.04); *B60C 2011/0355* (2013.04); *B60C 2200/065* (2013.04)

(58) Field of Classification Search
CPC .................. B60C 11/0311; B60C 2011/0348; B60C 11/12; B60C 2011/0355; B60C 2011/0346

USPC ........................................ 152/209.13, 209.27
See application file for complete search history.

(56) References Cited

U.S. PATENT DOCUMENTS 3,196,920 A   7/1965   Fishman
6,192,953 B1   2/2001   Fukumoto
(Continued)

FOREIGN PATENT DOCUMENTS

JP   62-292509 A   12/1987
JP   05-155204 A * 6/1993
(Continued)

OTHER PUBLICATIONS

Translation for Japan 05-155204 (no date).*
(Continued)

*Primary Examiner* — Steven D Maki
(74) *Attorney, Agent, or Firm* — Sughrue Mion, PLLC (57) ABSTRACT

An object of the present invention is to provide a pneumatic tire for a construction vehicle capable of suppressing deterioration in heat release property while maintaining high wear resistance especially when used as driving wheels. A central area 20 is provided with a central narrow groove 21 continuously extending along a tire circumferential direction in a zigzag form. Each side area 30 is provided with a side narrow groove 32. A width direction narrow groove 22 is provided The central narrow groove 21, the side narrow grooves 32 and the width direction narrow grooves 22 define plural polygonal block land portions 23 having five or more straight sides in the tread portion 10. The block land portions are lined in the tire circumferential direction to form two block arrays arranged next to each other.

9 Claims, 4 Drawing Sheets

(56) References Cited

U.S. PATENT DOCUMENTS

| | | | |
|---|---|---|---|
| D499,695 S | 12/2004 | Tanabe et al. | |
| 2004/0211502 A1* | 10/2004 | Ono | 152/209.27 |
| 2006/0269636 A1* | 11/2006 | Miyamae | 425/35 |
| 2007/0199633 A1* | 8/2007 | Hayashi | 152/209.18 |
| 2010/0180997 A1* | 7/2010 | Shimizu | 152/209.18 |

FOREIGN PATENT DOCUMENTS

| | | |
|---|---|---|
| JP | 11-222014 A | 8/1999 |
| JP | 2005-297909 A | 10/2005 |
| JP | 2006-143019 A | 6/2006 |
| JP | 2007-083822 A | 4/2007 |
| JP | 2007-191093 A | 8/2007 |
| WO | WO-2008/146851 A1 * | 12/2008 |

OTHER PUBLICATIONS

Chinese Office Action issued in Chinese Application No. 201080011156.X dated May 6, 2013.

Extended European Search Report issued in European Application No. 10738312.7 dated May 21, 2013.

International Search Report of PCT/JP2010/000425 dated Mar. 23, 2010.

* cited by examiner

FIG. 3

PNEUMATIC TIRE FOR CONSTRUCTION VEHICLE

CROSS REFERENCE TO RELATED APPLICATIONS

This application is a National Stage of International Application No. PCT/JP2010/000425 filed Jan. 26, 2010, claiming priority based on Japanese Patent Application No. 2009-026207, filed Feb. 6, 2009, the contents of all of which are incorporated herein by reference in their entirety.

TECHNICAL FIELD

The present invention relates to a pneumatic tire, and in particular, to a pneumatic tire for a construction vehicle applicable to a dump truck or other construction vehicles, which are mainly used in a construction site, a mine and the like.

RELATED ART

In general, a conventional pneumatic tire for a construction vehicle has plural lug grooves located at both sides of the tread in the tire width direction. In the pneumatic tire for the construction vehicle, for the purpose of improving a wear life of the tire, it is general to increase a tread gauge or reduce the area of groove portions to increase a tread volume.

However, in the case of improving a wear resistance by using the method described above, the heat release property at the tread portion tends to deteriorate especially when the tire rotates with load, in other words, the method described above tends to cause rise in temperatures at the tread portion. The rise in temperatures at the tread portion as described above unfavorably causes problems such as heat separation at the tread portion.

As a countermeasure against the problem described above, for example, Patent Document 1 describes a tire for a construction vehicle that suppresses deterioration in the heat release property, by employing a tread having a predetermined lateral narrow groove to efficiently deliver the wind flowing in a tread groove into the lateral narrow groove and air-cool the center portion of the tire. Further, Patent Document 2 discloses a pneumatic tire capable of reducing partial wear at a leading edge without largely reducing rigidity of a land portion, by providing a predetermined lateral sub-groove at each block land portion forming a shoulder area of the tread, so that the leading edge can leave a road surface rapidly at the time when the leading edge kicks out the road surface.

However, in recent years, with increase in size of construction vehicles, sizes of tires increase, profile of the tires becomes increasingly low, and load that the tires have to bear becomes heavy, which makes the deterioration in the heat release property of the tread portion tend to be prominent. Therefore, it is considered to be still important to develop a pneumatic tire for a construction vehicle capable of suppressing the deterioration in the heat release property at the tread portion while maintaining high wear resistance. Further, in particular, for tires used as driving wheels, it is necessary to further improve the property concerning wear due to traction.

RELATED ART DOCUMENT

Patent Document

Patent Document 1: Japanese Patent Application Laid-open No. 2007-191093
Patent Document 2: Japanese Patent Application Laid-open No. 2007-83822

DISCLOSURE OF THE INVENTION

Problems to be Solved by the Invention

An object of the present invention is to provide a pneumatic tire for a construction vehicle capable of suppressing deterioration in heat release property while maintaining high wear resistance property especially when used as driving wheels, by optimizing a tread.

Means for Solving the Problem

The present inventor made a keen study to solve the above-mentioned problems of the pneumatic tire for the construction vehicle having a tread divided into a central area and two side areas located at both sides of the central area in a tire width direction, and a plurality of lug grooves arranged in each of the side areas, and, as a result, found that it is possible to reduce the shearing force of the tire at the kick-off side, and improve the wear resistance, by configuring the pneumatic tire for the construction vehicle such that: the central area is provided with a central narrow groove continuously extending along the tire circumferential direction in a zigzag form and formed by alternately connecting a first inclined groove portion extending at a predetermined angle with respect to a tire circumferential direction and a second inclined groove portion extending at an opposite angle to the first inclined groove portion with respect to the tire circumferential direction; each of the side areas is provided with a side narrow groove passing through a tire width direction inner side portion of each of the lug grooves and extending in the tire circumferential direction; the tire width direction inner side portion of each of the lug grooves is arranged to face a proximate joint portion of joint portions of the first inclined groove portion and the second inclined groove portion in the tire width direction; a width direction narrow groove is provided between the tire width direction inner side portion of each of the lug grooves and the proximate join portion; and, the central narrow groove, the side narrow grooves and the width direction narrow groove define a plurality of polygonal block land portions having five or more sides in the tread portion, the block land portions being lined in the tire circumferential direction to form two block arrays. With this configuration, when used as driving wheels of a dump truck or the like, a polygonal block land preceedingly contacting with the ground drags a polygonal block opposing the preceding polygonal block land portion across the central narrow groove at the time of traveling, and the dragged polygonal block is in a deformed state before contacting with the ground. This causes a shearing force to occur between the road surface and the dragged polygonal block land upon contact of the dragged polygonal block with the road surface, whereby it is possible to improve the traction performance.

The present invention has been made in view of the findings described above, and the main points thereof are as follows:

(1) A pneumatic tire for a construction vehicle having a tread divided into a central area and two side areas located at both sides of the central area in a tire width direction, and a plurality of lug grooves arranged in each of the side areas, in which the central area is provided with a central narrow groove continuously extending along the tire circumferential direction in a zigzag form and formed by alternately connecting a first inclined groove portion extending at a predetermined angle with respect to a tire circumferential direction and a second inclined groove portion extending at an opposite angle to the first inclined groove portion with respect to the tire circumferential direction; each of the side areas is provided with a side narrow groove passing through a tire width direction inner side portion of each of the lug grooves and extending in the tire circumferential direction; the tire width direction inner side portion of each of the lug grooves is arranged to face a proximate joint portion of joint portions of the first inclined groove portion and the second inclined groove portion in the tire width direction; a width direction narrow groove is provided between the tire width direction inner side portion of each of the lug grooves and the proximate join portion; and, the central narrow groove, the side narrow grooves and the width direction narrow groove define a plurality of polygonal block land portions having five or more sides in the tread portion, the block land portions being lined in the tire circumferential direction to form two block arrays arranged next to each other.

(2) The pneumatic tire for a construction vehicle according to (1) described above, in which a groove depth of the central narrow groove is 60% or more of a groove depth of each of the lug grooves.

(3) The pneumatic tire for a construction vehicle according to (1) or (2) described above, in which an amplitude of the central narrow groove is in the range of 5% to 30% of the tread width.

(4) The pneumatic tire for a construction vehicle according to any one of (1) to (3) described above, in which the first inclined groove portion extends at an angle in the range of 20° to 50° with respect to the tire circumferential direction.

(5) The pneumatic tire for a construction vehicle according to any one of (1) to (4) described above, in which the second inclined groove portion extends at an angle in the range of −20° to −50° with respect to the tire circumferential direction.

(6) The pneumatic tire for a construction vehicle according to any one of (1) to (5) described above, in which a groove width of the central narrow groove is in the range of 3% to 8% of an arrangement pitch of the block land portions.

(7) The pneumatic tire for a construction vehicle according to any one of (1) to (6) described above, in which, under the condition of the tire being contact with the road surface, opposed groove walls of the first inclined groove portion and the second inclined groove portion of the central narrow groove and the width direction narrow groove are brought into contact with each other, and opposed groove walls of the side narrow grooves are not brought into contact with each other.

Effect of the Invention

According to the present invention, it is possible to provide a pneumatic tire for a construction vehicle capable of suppressing deterioration in heat release property while maintaining high wear resistance property especially when used as driving wheels.

BEST MODE FOR CARRYING OUT THE INVENTION

Figure 1:
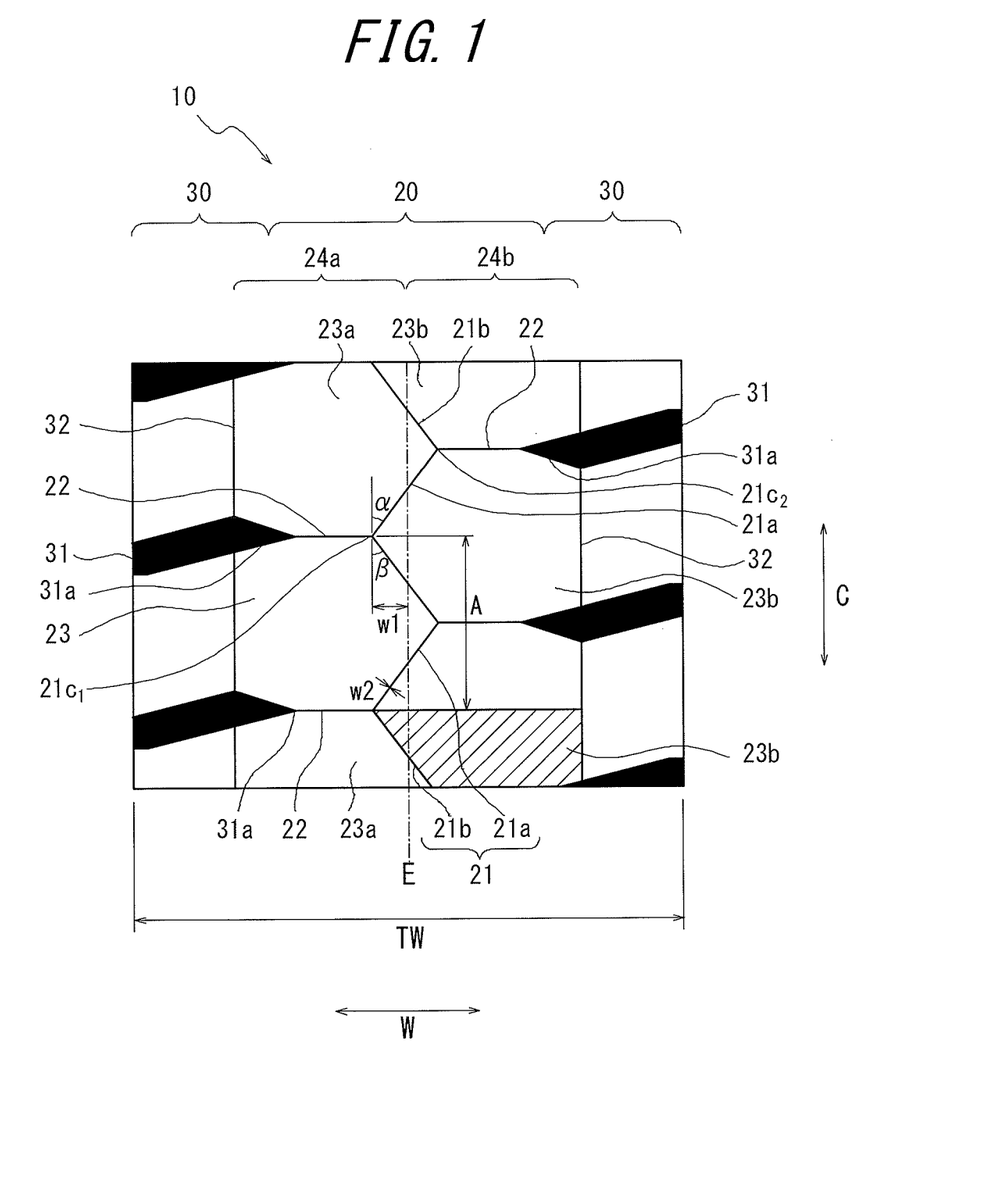
FIG. 1 is a diagram schematically illustrating a part of a tread according to an embodiment of a pneumatic tire for a construction vehicle of the present invention.
Figure 2:
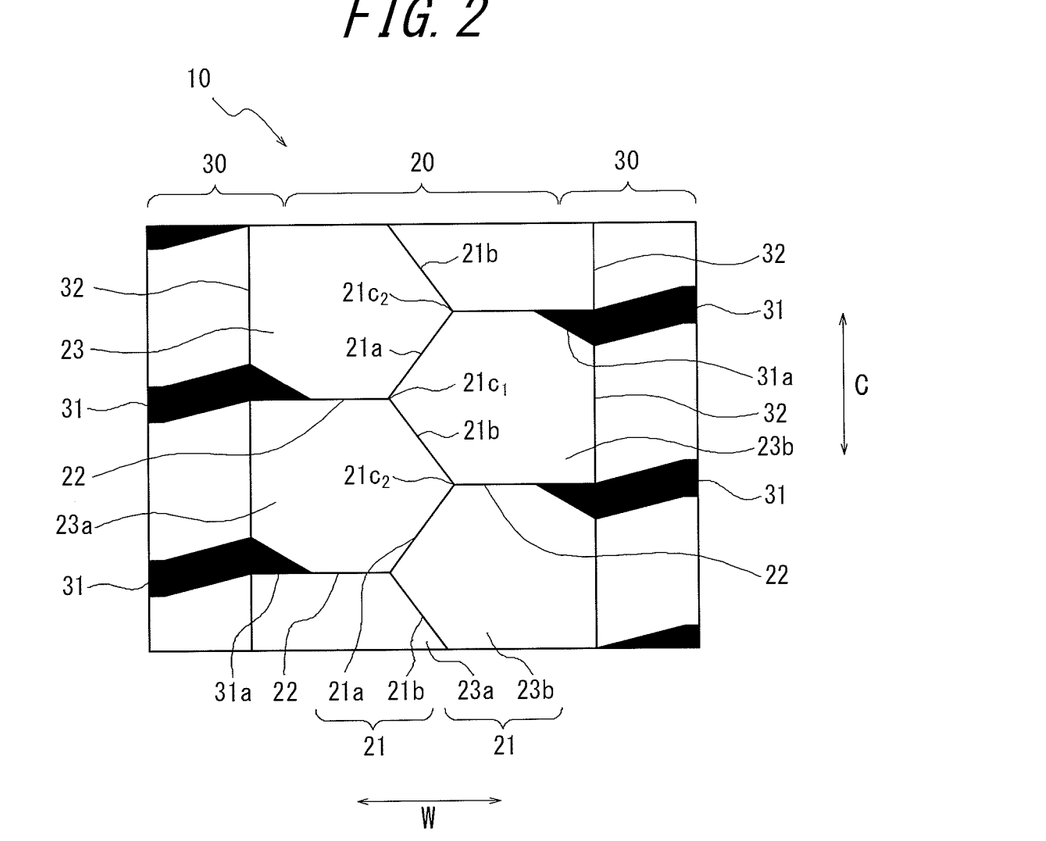
FIG. 2 is a diagram schematically illustrating a part of a tread according to another embodiment of a pneumatic tire for a construction vehicle of the present invention.
Figure 3:
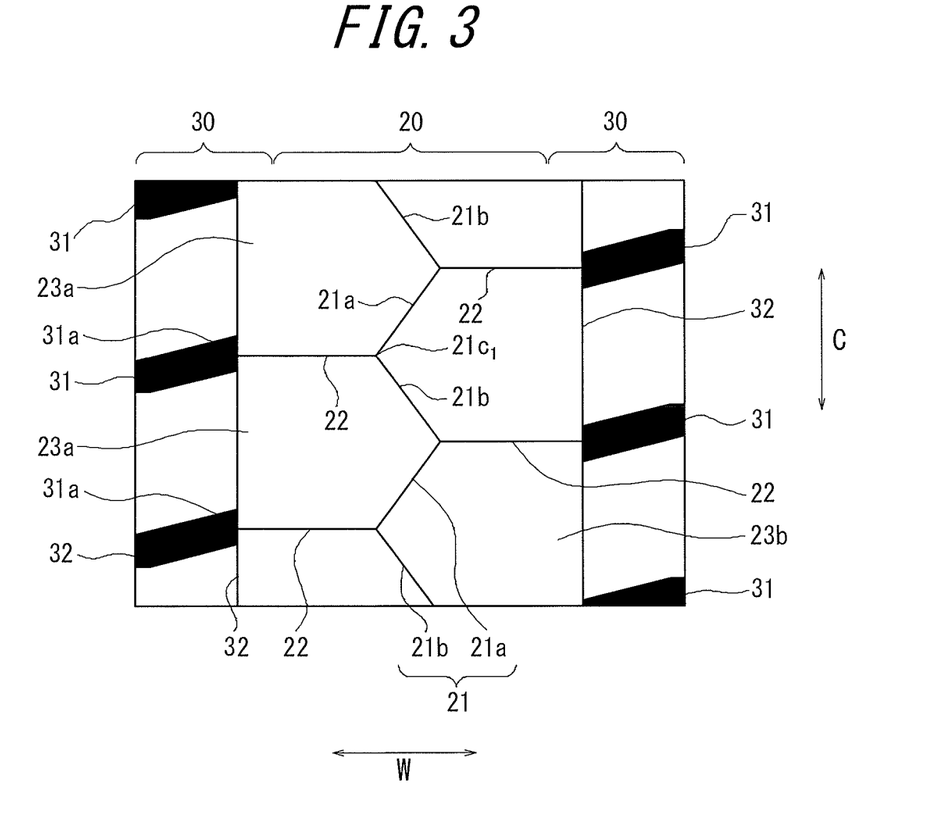
FIG. 3 is a diagram schematically illustrating a part of a tread according to another embodiment of a pneumatic tire for a construction vehicle of the present invention.
Figure 4:
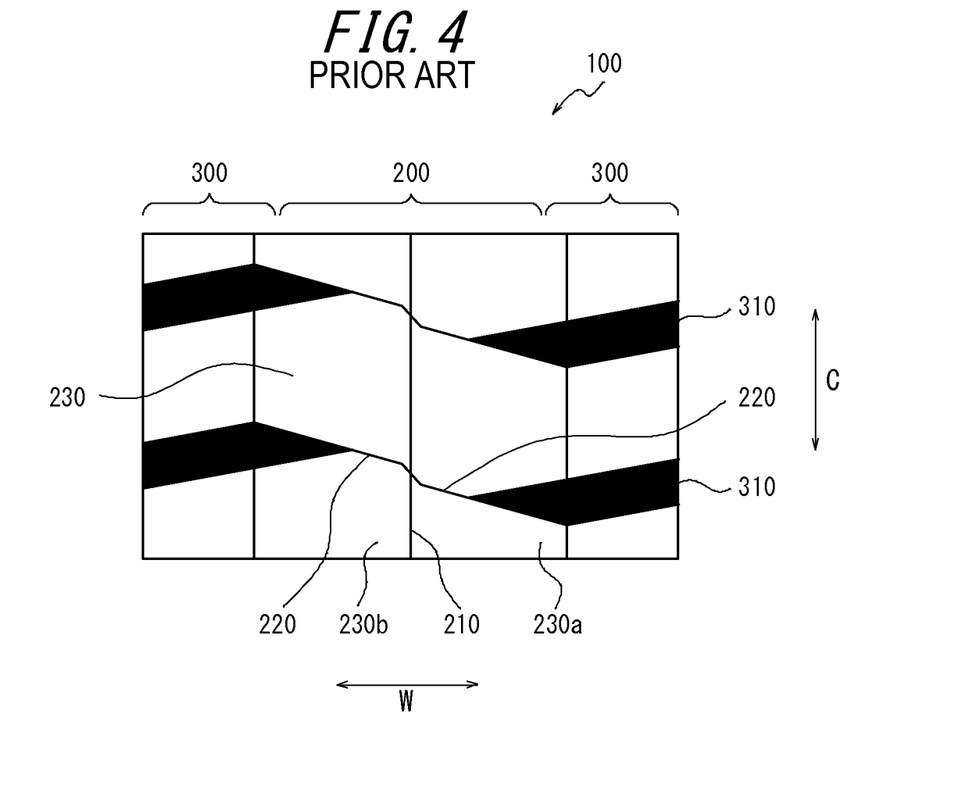
FIG. 4 is a diagram schematically illustrating a part of a tread of a conventional pneumatic tire for a construction vehicle.

Hereinbelow, a configuration of the present invention and a reason for limitation will be described with reference to FIG. 1 through FIG. 4. FIG. 1 is a diagram schematically illustrating a part of a tread according to an embodiment of a pneumatic tire for a construction vehicle of the present invention; FIG. 2 and FIG. 3 are diagrams each schematically illustrating a part of a tread according to another embodiments of a pneumatic tire for a construction vehicle of the present invention; and FIG. 4 is a diagram schematically illustrating a part of a tread of a conventional pneumatic tire for a construction vehicle. It should be noted that, in FIG. 1 through FIG. 4, the direction of the arrow C in each of the drawings represents a tire circumferential direction, and the direction of the arrow W represents a tire width direction.

According to a pneumatic tire for a construction vehicle of the present invention, as illustrated in FIG. 1, a tread 10 is divided into a central area 20, and two side areas 30 located at both sides of the central area 20 in the tire width direction. In the pneumatic tire for a construction vehicle, each of the side areas 30 has plural lug grooves 31. In this specification, the central area 20 refers to an area within 50% or lower of the tread width with a tire equator E being as the center, and the side area 30 refers to an area other than the central area 20 in the tread.

According to the present invention, as illustrated in FIG. 1, the central area 20 is provided with a central narrow groove 21 continuously extending along the tire circumferential direction in a zigzag form and formed by alternately connecting a first inclined groove portion 21a extending at a predetermined angle with respect to the tire circumferential direction and a second inclined groove portion 21b extending at an opposite angle to the first inclined groove portion 21a with respect to the tire circumferential direction; each of the side areas 30 is provided with a side narrow groove 32 passing through a tire width direction inner side portion 31a of each of the lug grooves 31 and extending in the tire circumferential direction; the tire width direction inner side portion 31a of each of the lug grooves 31 is arranged to face a proximate joint portion $21c_2$ of joint portions $21c_1$ and $21c_2$ of the first inclined groove portion and the second inclined groove portion in the tire width direction; a width direction narrow groove 22 is provided so as to extend and pass between the tire width direction inner side portion 31a of each of the lug grooves and the proximate join portion 21c; and, the central narrow groove 21, the side narrow grooves 32 and the width direction narrow grooves 22 define plural polygonal block land portions 23a and 23b having five or more sides in the tread portion, the block land portions being lined in the tire circumferential direction to form two block arrays 24a and 24b arranged next to each other.

With the configuration described above, the polygonal block arrays 24a and 24b according to the present invention are located on both sides of the central narrow groove 21 extending in the tire circumferential direction C in the zigzag form, and a top end portion of each of the polygonal blocks 23a and 23b is adjacent to polygonal blocks extending past a tire equatorial plane E and facing the top end portion. Therefore, in the case where the tires are used in driving wheels of a dump truck and the like, a polygonal block land portion preceedingly contacting with the ground (polygonal block land portion 23a in FIG. 1) drags a part of a polygonal block land portion 23 located on the opposite side of the preceding polygonal block land portion with respect to the central narrow groove (shaded portion of the polygonal block land portion 23b in FIG. 1) at the time of traveling, and the dragged part of the polygonal block land portion 23b is in a deformed state before contacting with the ground. As a result, a shearing force occurs between the road surface and the dragged polygonal block land portion 23b upon contact of the polygonal block land portion 23b with the road surface, whereby it is possible to improve the traction. This improvement in the traction leads to reduction in the shearing force at the time of kicking out of the tire, which is a main cause of wear of the tire, whereby it is possible to improve wear resistance.

It should be noted that it is considered that, as illustrated in FIG. 4, a conventional tread 100 has polygonal block land portions 230 located at both sides of a straight central narrow groove 210 extending along the tire circumferential direction. Therefore, unlike the tread as described above, the traction improvement due to the shearing force between the dragged polygonal block and the road surface cannot be obtained at the time of traveling, and hence, the wear resistance cannot be sufficiently improved.

According to the present invention, the central narrow groove 21 is provided in the central area 20 in a manner that the first inclined groove portion 21a and the second inclined groove portion 21b are alternately jointed, and continuously extends along the tire circumferential direction in a zigzag form. Further, although other configurations thereof are not specifically limited, it is preferable that a groove depth of the central narrow groove 21 is 60% or more of a groove depth of the lug groove. This is because, in the case where the groove depth of the central narrow groove 21 is less than 60%, the tread wears and the central narrow groove 21 vanishes at the end of tire use, and hence, there is a possibility that the effect of the present invention cannot be sufficiently obtained.

Further, as illustrated in FIG. 1, it is preferable that amplitude w1 of the shape in which the central narrow groove 21 extends is in the range of 5% to 30% of the tread width TW. In the case where the amplitude w1 is less than 5%, a force for pulling the part of the polygonal block 23 is undesirably small, and hence, there is a possibility that the traction cannot be sufficiently improved and the wear resistance cannot be sufficiently improved. On the other hand, in the case where the amplitude w1 exceeds 30%, the block rigidity at the center portion decreases, and hence, the wear property cannot be improved.

Further, it is preferable that the first inclined groove portion 21a extends at an angle $\alpha$ in the range of 20° to 50° with respect to the tire circumferential direction. In the case where the angle $\alpha$ is less than 20°, a force for dragging the part of the polygonal block 23 is undesirably small, and hence, there is a possibility that the traction cannot be sufficiently improved and the wear resistance cannot be sufficiently improved. On the other hand, in the case where the angle $\alpha$ exceeds 50°, the block rigidity at the center portion decreases, and hence, the wear property cannot be improved.

Further, for the same reason, it is preferable that the second inclined groove portion 21b extends at an angle in the range of −20° to −50° with respect to the tire circumferential direction.

Yet further, as illustrated in FIG. 1, it is preferable that a groove width w2 of the central narrow groove 21 is in the range of 3% to 8% of an arrangement pitch A of the block land portions 23. This is because, in the case where the groove width w2 of the central narrow groove 21 is less than 3% of the arrangement pitch, the groove width is undesirably narrow, and hence, a heat-radiation effect cannot be obtained, possibly causing deterioration in the heat release property. On the other hand, in the case where the groove width w2 exceeds 8%, the force for pulling the part of the polygonal block 23 is undesirably small, and hence, there is a possibility that the traction cannot be sufficiently improved and the wear resistance cannot be sufficiently improved.

It should be noted that the side narrow grooves 32 are grooves passing through the tire width direction inner side portion 31a of the lug groove 31 and extending in the tire circumferential direction, and the configuration thereof is not specifically limited. In this specification, the tire width direction inner side portion 31a of the lug groove 31 refers to a portion of the lug groove 31 extending from a position where the groove width thereof starts to decrease, to a top end on the inner side of the lug groove 31 in the tire width direction.

Further, the width direction narrow grooves 22 are grooves extending and communicating between the tire width direction inner side portion 31a of the lug groove 31 and the proximate joint portion 21c$_2$ of the central narrow groove 21, and the other configurations thereof are not specifically limited.

However, it is preferable that, as is the case with the central narrow groove 21, each of the width direction narrow grooves 22 has a groove width in the range of 3% to 8% of the arrangement pitch A of the block land portion 23. This is because, in the case where the groove width of the width direction narrow groove 22 is less than 3% of the arrangement pitch, the width groove is undesirably narrow, and hence, the heat radiation effect cannot be obtained, possibly causing deterioration in the heat release property. On the other hand, in the case where the groove width thereof exceeds 8%, the force for dragging the part of the polygonal block 23 is undesirably small, and hence, there is a possibility that the traction cannot be sufficiently improved and the wear resistance cannot be sufficiently improved.

Further, it is preferable that, at the time when the tire is brought into contact with the road surface, opposed groove walls of the first inclined groove portion 21a, the second inclined groove portion 21b and the width direction narrow groove 22 are brought into contact with each other, and opposed groove walls of the side narrow groove 32 are not brought into contact with each other. This is because, by configuring the first inclined groove portion 21a, the second inclined groove portion 21b and the width direction narrow groove 22 such that the opposed groove walls thereof are brought into contact with each other, and then, the grooves thereof are closed, the blocks of the center portion 20 can be improved, whereby it is possible to further improve the wear resistance. On the other hand, by configuring the groove walls of the side narrow groove 22 so as not to be brought into contact with each other, the grooves thereof are not closed, whereby it is possible to maintain the favorable heat release resistance. Note that the tire that is brought into contact with the road surface is in a state where it is assembled with a normal rim in accordance with TRA, inflated at a normal internal pressure in accordance with TRA, and then, subjected to a normal load (100%) in accordance with TRA.

It should be noted that, as illustrated in FIG. 1, the polygonal block land portions 23 having five or more sides and defined by the central narrow groove 21, the side narrow grooves 32, the lug grooves 31 and the width direction narrow grooves 22 are lined in the tire circumferential direction c to form two block arrays 24a and 24b arranged next to each other.

Further, specific limitation is not applied to the polygonal block land portion 23, provided that the polygonal block land portion 23 is a five- or more-sided polygon. Depending on the shape of the tire width direction inner side portion 31a of the lug groove 31, it may be possible to employ, for example, a seven-sided polygonal block as illustrated in FIG. 1, a polygonal block land portion 23 having a hexagonal shape as illustrated in FIG. 2, and a polygonal block land portion 23 having a pentagonal shape as illustrated in FIG. 3.

It should be noted that, in any cases of pentagon, hexagon and heptagon, it is possible to improve the traction and reduce the shearing force at the time of kicking out of the tire, which is a main cause of wear, whereby it is possible to improve the wear resistance.

Those described above are only one example of embodiments of the present invention, and various modifications can be applied within a scope of claims.

Next, examples will be described.

Example 1

As Example 1, a sample pneumatic tire was prepared, in which the side areas 30 of the tread 1 are provided with the plural lug grooves 31; the central area 20 is provided with the central narrow groove 21 continuously extending along the tire circumferential direction in a zigzag form and formed by alternately connecting the first inclined groove portion 21a extending at a predetermined angle (Table 1) with respect to the tire circumferential direction and the second inclined groove portion 21b extending at an opposite angle (Table 1) to the first inclined groove portion 21a with respect to the tire circumferential direction; each of the side areas 30 is provided with the side narrow groove 32 passing through the tire width direction inner side portion 31a of each of the lug grooves 31 and extending in the tire circumferential direction; the tire width direction inner side portion 31a of each of the lug grooves 31 is arranged to face the proximate joint portion 21c of the joint portions 21c of the first inclined groove portion and the second inclined groove portion in the tire width direction; the width direction narrow groove 22 is provided so as to communicate between the tire width direction inner side portion 31a of each of the lug grooves and the proximate join portion 21c and extend in a direction inclined at 90° with respect to the tire circumferential direction; and, the central narrow groove 21, the side narrow grooves 32 and the width direction narrow grooves 22 define plural heptagonal block land portions 23, the block land portions 23 being lined in the tire circumferential direction.

It should be noted that Table 1 shows a groove depth (mm) of the rib groove 31, a groove depth (mm) of the central narrow groove 21, lengths (%) of the first inclined groove portion and the second inclined groove portion in the tire width direction relative to the tread width, and angles (°) of the first inclined groove portion 21a and the second inclined groove portion 21a with respect to the tire circumferential direction of the pneumatic tire.

Example 2

As Example 2, a sample as illustrated in FIG. 2 was prepared under the same conditions as those for Example 1 except that the polygonal block land portion 23 is formed in a hexagonal shape.

It should be noted that Table 1 shows a groove depth (mm) of the rib groove 31, a groove depth (mm) of the central narrow groove 21, lengths (%) of the first inclined groove portion and the second inclined groove portion in the tire width direction relative to the tread width, and angles (°) of the first inclined groove portion 21a and the second inclined groove portion 21a with respect to the tire circumferential direction of the pneumatic tire.

Example 3

As Example 3, a sample as illustrated in FIG. 3 was prepared under the same conditions as those for Example 1 except that the polygonal block land portion 23 is formed in a pentagonal shape.

It should be noted that Table 1 shows a groove depth (mm) of the rib groove 31, a groove depth (mm) of the central narrow groove 21, lengths (%) of the first inclined groove portion and the second inclined groove portion in the tire width direction relative to the tread width, and angles (°) of the first inclined groove portion 21a and the second inclined groove portion 21a with respect to the tire circumferential direction of the pneumatic tire.

Comparative Example 1

As Comparative Example 1, a sample tire as illustrated in FIG. 4 was prepared under the same conditions as those for Example 1 except that Comparative Example 1 has a conventional tread 100 in which polygonal block land portions 230 are provided on both sides of a central narrow groove 210 extending along the tire circumferential direction in a straight form, rather than in a zigzag form.

[Evaluation 1]

The pneumatic tires of Example 1, Example 2 and Comparative Example 1 were assembled with a normal rim under the TRA; inflated at a normal inner pressure under the TRA; mounted to a vehicle; and traveled in the market. Thereafter, the groove depths (mm) thereof were measured at a predetermined position in the tread (at a position located on the outer side of the center by 25% of the tread width), and wear resistance of the sample tires was evaluated. The results thereof are shown in Table 1.

It should be noted that the evaluation results are shown by relative proportion (%) with the wear resistance of the tire of Comparative Example 1 being set to 100%, and the larger value (%) represents the better results.

[Evaluation 2]

The pneumatic tires of Example 1, Example 2 and Comparative Example 1 were assembled with a normal rim under the TRA; inflated at a normal inner pressure under the TRA; subjected to a normal load (100%) under the TRA; and subjected to a drum test in a room under a test speed of 8 km/h for 24 hours. Thereafter, temperatures at the tread center portion were measured to evaluate the heat release property. The results thereof are shown in Table 1.

It should be noted that the evaluation results are shown by relative temperatures (° C.) with the heat release property of the tire of Comparative Example 1 being set to 0, and the lower value (° C.) represents the better results.

TABLE 1

| | Condition of pneumatic tire | | | | | | Evaluation | |
|---|---|---|---|---|---|---|---|---|
| | Depth D1 of lug groove (mm) | Depth D2 of central narrow groove (mm) | D2/D1 × 100 (%) | Amplitude of extending shape of central narrow groove relative to tread width (%) | Angles of first and second inclined groove portions with respect to tire circumferential direction (°) | | Block land portion | Wear resistance (%) | Heat release property (%) |
| | | | | | First inclined groove portion | Second inclined groove portion | | | |
| Example 1 | 97 | 90 | 93 | 13 | 38 | −38 | Heptagon | 110 | −5 |
| Example 2 | 97 | 90 | 93 | 13 | 38 | −38 | Hexagon | 110 | −5 |
| Example 3 | 97 | 90 | 93 | 13 | 38 | −38 | Pentagon | 110 | −5 |
| Comparative Example 1 | 97 | 90 | 93 | — | | | Pentagon | 100 | 0 |

Based on the results shown in Table 1, it can be known that the pneumatic tires of Examples 1, 2 and 3 according to the present invention improve the wear resistance by 10% as compared with Comparative Example 1, which is a pneumatic tire having the conventional tread. Further, it can be known that the heat release property is reduced by 5° C., and hence, the pneumatic tire according to the present invention has higher wear resistance, as compared with the conventional pneumatic tire, while suppressing deterioration in the heat release property.

INDUSTRIAL APPLICABILITY

According to the present invention, it is possible to provide a pneumatic tire for a construction vehicle capable of suppressing deterioration in heat release property while maintaining high wear resistance property especially when used as driving wheels.

EXPLANATION OF REFERENCE NUMERALS

10 Tread
20, 200 Central area
21, 210 Central narrow groove
22, 220 Width direction narrow groove
30, 300 Side area
31, 310 Lug groove
32 Side narrow groove

The invention claimed is:

1. A pneumatic tire for a construction vehicle having a tread divided into a central area and two side areas located at both sides of the central area in a tire width direction, and a plurality of lug grooves arranged in each of the side areas, wherein
the central area is provided with a central narrow groove continuously extending along the tire circumferential direction in a zigzag form and formed by alternately connecting a first inclined groove portion extending at a predetermined angle with respect to a tire circumferential direction and a second inclined groove portion extending in the same circumferential direction but opposite widthwise direction at an opposite angle to the first inclined groove portion with respect to the tire circumferential direction;
each of the side areas is provided with a side narrow groove passing through a tire width direction inner side portion of each of the lug grooves and extending in the tire circumferential direction;
the tire width direction inner side portion of each of the lug grooves is arranged to face a proximate joint portion of joint portions of the first inclined groove portion and the second inclined groove portion in the tire width direction;
a width direction narrow groove is provided between the tire width direction inner side portion of each of the lug grooves and the proximate joint portion; and,
the central narrow groove, the side narrow grooves and the width direction narrow groove define a plurality of polygonal block land portions having five or more sides in the tread portion, the block land portions being lined in the tire circumferential direction to form two block arrays arranged next to each other.

2. The pneumatic tire for a construction vehicle according to claim 1, wherein
a groove depth of the central narrow groove is 60% or more of a groove depth of each of the lug grooves.

3. The pneumatic tire for a construction vehicle according to claim 1, wherein
an amplitude of an extending shape of the central narrow groove is in the range of 5% to 30% of the tread width.

4. The pneumatic tire for a construction vehicle according to claim 1, wherein
the first inclined groove portion extends at an angle in the range of 20° to 50° with respect to the tire circumferential direction.

5. The pneumatic tire for a construction vehicle according to claim 1, wherein
the second inclined groove portion extends at an angle in the range of −20° to −50° with respect to the tire circumferential direction.

6. The pneumatic tire for a construction vehicle according to claim 1, wherein
a groove width of the central narrow groove is in the range of 3% to 8% of an arrangement pitch of the block land portions.

7. The pneumatic tire for a construction vehicle according to claim 1, wherein,
under the condition of the tire being contact with the road surface, opposed groove walls of the first inclined groove portion and the second inclined groove portion of the central narrow groove and the width direction narrow groove are brought into contact with each other, and opposed groove walls of the side narrow grooves are not brought into contact with each other.

8. The pneumatic tire for a construction vehicle according to claim 1, wherein the first inclined groove portion and the second inclined groove portion do not overlap when viewed from a width direction of the pneumatic tire.

9. The pneumatic tire for a construction vehicle according to claim 1, wherein the first inclined groove portion crosses an equatorial plane of the pneumatic tire and the second inclined groove portion crosses an equatorial plane of the pneumatic tire.

* * * * *